United States Patent [19]

Mandracchia et al.

[11] Patent Number: 4,854,607
[45] Date of Patent: Aug. 8, 1989

[54] HARNESS FOR SMALL CHILDREN

[76] Inventors: Charles D. Mandracchia; Janet A. Mandracchia, both of 51 Van Cedar St., Brentwood, N.Y. 11717

[21] Appl. No.: 244,383

[22] Filed: Sep. 15, 1988

[51] Int. Cl.⁴ .............................................. B60R 21/10
[52] U.S. Cl. ...................................... 280/801; 119/96; 280/33.992; 280/290
[58] Field of Search .................... 280/290, 33.992, 801, 280/808; 119/96

[56] References Cited

U.S. PATENT DOCUMENTS

| | | | |
|---|---|---|---|
| 758,123 | 4/1904 | Weis | 119/96 |
| 2,208,990 | 7/1940 | Lewis | 119/96 |
| 2,290,318 | 7/1942 | Deike, Jr. et al. | 119/96 |
| 4,537,154 | 8/1985 | Kay | 119/96 |
| 4,597,359 | 7/1986 | Moorman | 119/1 |
| 4,621,589 | 11/1986 | Thinnes | 119/96 |
| 4,666,017 | 5/1987 | Zimmerman | 119/96 |

Primary Examiner—Kenneth R. Rice
Attorney, Agent, or Firm—Henderson & Sturm

[57] ABSTRACT

A safety harness apparatus (10) adapted to secure a child (100) to an independent structure (50); wherein, the harness apparatus (10) comprises a harness unit (11) a tether unit (12) and a locking means (13) for operatively securing the tether unit (12) to the harness unit (11); wherein the harness unit (11) includes a belt element (30) having a cable member (31) incorporated into its construction; whereby, one end of the cable member (31) surrounds a plurality of apertures (32) formed in the belt element (30); and, the other end of the cable member (31) is provided with a discrete ring member (37) that is dimensioned to expand through the belt apertures (32) and receive a portion of the locking means (13).

5 Claims, 1 Drawing Sheet

HARNESS FOR SMALL CHILDREN

TECHNICAL FIELD

The present invention relates generally to a safety harness for small children, and in particular to a safety harness and tether arrangement having a lockable securing means.

BACKGROUND OF THE INVENTION

As can be seen by reference to the following U.S. Pat. Nos: 4,621,589; 4,537,154; 4,597,359; and 4,667,017, the prior art is replete with myriad and diverse safety harness constructions for children.

While the prior art constructions are more than adequate for the purpose and function for which they were specifically designed, they do suffer from a number of shared deficiencies.

For instance, most of the prior art constructions do not provide a locking means to prevent an unauthorized person from releasing a tethered child. Because of the increase in child abductions in recent times, it is important to provide a secure system with a locking means to protect children from kidnapping.

In addition, the single prior art construction that does provide a lock is both bulky and overly complex in its construction. This particular construction utilizes two resident lock constructions, rather than allowing for the use of any conventional padlock device. This situation is unfortunate because the specialized locking construction will dramatically increase the cost of the device. Additionally, if the resident locking means becomes non-functional, the entire construction is rendered useless.

Obviously there has been a long standing need for a safety harness for children which incorporates the features of utmost safety, affordability and adapability, and, the development of such a device is the stated purpose and objective of the present invention.

BRIEF SUMMARY OF THE INVENTION

The safety harness construction that forms the basis of the present invention comprises in general a harness unit, a strap unit, a belt unit, and a tether unit. The harness unit comprises in general a pair of adjustable shoulder strap members and an adjustable chest strap member; wherein, the strap arrangement of the harness unit is dimensioned to conform to the upper torso of a small child.

The strap unit comprises a pair of strap members and a securing means for each strap member; wherein, the strap members are operably attached to the shoulder strap members of the harness unit proximate the back midsection; and wherein, each strap member has an associated securing means at its free end, so that the strap unit may be fastened to a shopping cart to hold the harnessed child safely in the shopping cart seat.

The belt unit comprises a housing member and a reinforcing cable member; wherein, the cable member is enclosed by the housing member; and wherein, the cable forms a secure method of encircling a child. The shoulder strap members are operably attached at the front and back of the belt unit.

The tether unit comprises a length of rope or cable; wherein, in the outermost ends of the cable are provided with loop elements; and wherein, the tether unit may be secured at one end to a shopping cart and at the opposite end to the belt unit by means of the loop elements.

Briefly stated, the aforementioned arrangement allows a child to be placed comfortably within the harness unit and locked there using the belt unit; whereby the strap unit and tether unit safely secure the child to a shopping cart.

It should also be noted that this arrangement is equally suitable for use in conjunction with strollers, carriages, car seats; and, may also be used by itself under the control of a parent's hand or attached to any other restraining structure that is handy to control the childs movements at home, in stores or outside the home in general.

BRIEF DESCRIPTION OF THE DRAWINGS

These and other objects, advantages, and novel features of the invention will become apparent from the detailed description of the best mode for carrying out the preferred embodiment of this invention which follows, particularly when considered in conjunction with the accompanying drawings, wherein.

BEST MODE FOR CARRYING OUT THE INVENTION

Figure 1:
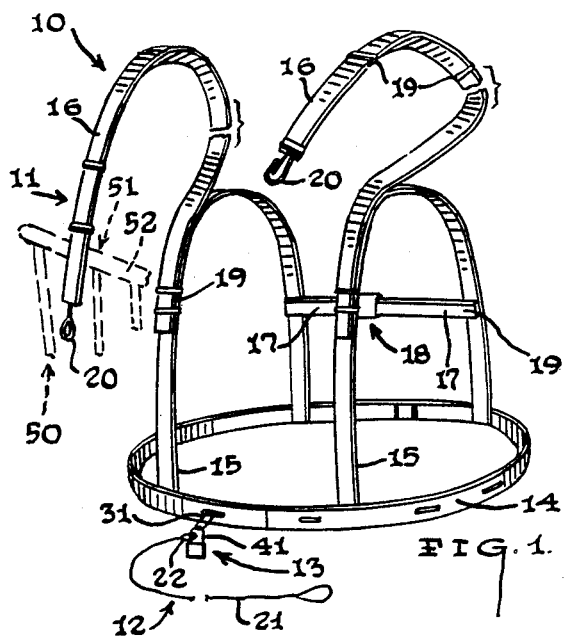
FIG. 1 is a perspective view of the safety harness construction in its intended environment.

As can be seen by reference to the drawings and in particular to FIG. 1, the safety harness apparatus for children that forms the basis of the present invention is designated generally by the reference numeral (10). The safety harness apparatus (10) comprises in general a harness unit (11) a tether unit (12) and a locking means (13). These units will now be described in seriatim fashion.

Figure 5:
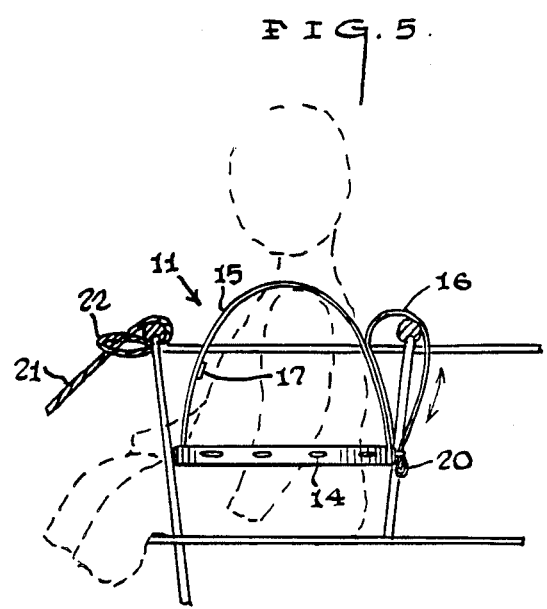
Fig. 5 is a perspective view of the safety harness construction in one mode of deployment.

As can best be seen by reference to FIGS. 1 and 5, the harness unit (11) comprises a belt member (14) operatively secured to a pair of shoulder strap members (15) wherein each of the shoulder strap members (15) are provided with cooperating back strap members (16); and, wherein a pair of chest strap elements (17) operatively connect the shoulder strap members (15) together via a releasable closure member (18).

As shown in FIG. 1, both the shoulder strap members (15) and the back strap members (16) are provided with adjustment means (19); wherein, the effective length of the respective strap members (15) and (16) may be varied: both to snugly secure the harness unit (11) to the upper portion of a child's torso (100); and, to secure the harness unit (11) to an independent structure (50) such as a shopping cart (51) or the like.

In addition, the free ends of the back strap members (16) are provided with cooperating releasable securing means (20); wherein, the back strap members (16) may be secured to one another, or to the belt member (14) and/or an independent structure (50) such as the shopping cart (51) or the tether unit (12).

Figure 4:
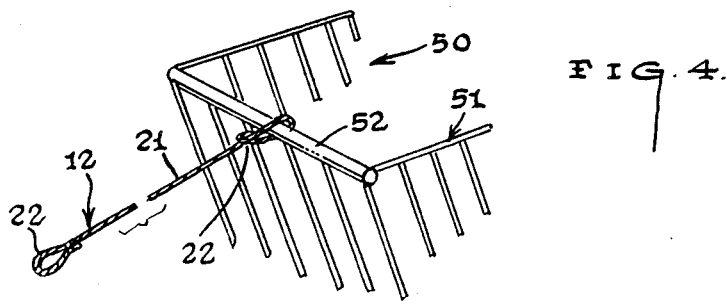
FIG. 4 is an isolated detail view of the tether unit.

As depicted in FIGS. 1, 4, and 5, the tether unit (12) comprises an elongated length of flexible cable (21) having closed loops (22) formed on its opposite ends; wherein, one end of the looped cable (21) may be passed through the other end to capturingly engage an independent structure (50) such as the handlebar (52) of a shopping cart (51). In the preferred embodiment of this invention the exterior flexible cable (21) will be sheathed or otherwise protected with a well recognized plastic or rubber coating to prevent the cable (21) from causing abrasions to the child (100) or any other object that it would come in contact with.

Figure 2:
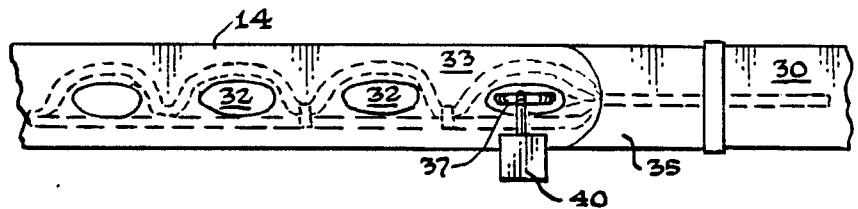
FIG. 2 is an enlarged detail view of the belt member.
Figure 3:
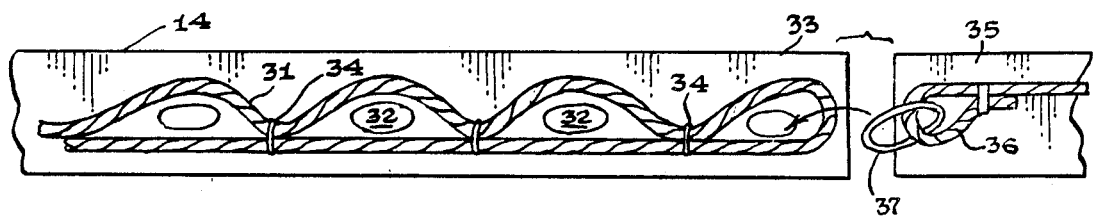
FIG. 3 is a cross-sectional view of the belt member.

Turning now to FIGS. 2 and 3, it can be seen that the belt member (14) comprises an apertured belt element (30) having a cable member (31) running along the entire length of the belt element (30); wherein, the cable member (31) is disposed in a surrounding relationship relative to the plurality of elongated belt apertures (32) that are formed on one end (33) of the belt member (30).

As can best be seen by reference to FIG. 3, the cable member (31) is looped around each of the elongated belt apertures (32) and joined together as at (34) intermediate each of the belt apertures (32). In addition, at the other end (35) of the belt element (30) the cable member (31) is formed into a relatively small closed loop (36); wherein, the closed cable loop (36) is provided with a discrete ring member (37) that is dimensioned to pass through any one of the elongated belt apertures (32) to adjustably secure the belt member (14) around a child's waist.

As shown in FIG. 3, the locking means (13) of this invention comprises a well recognized padlock member (40) having a generally U-shaped locking bail element (41) which is dimensioned to receive both the ring member (37) on the belt element (30) and one of the loops (22) on the tether unit (11). By virtue of this arrangement the locking means (13) may operatively secure a child in the harness unit (11); as well as securing the harness unit (11) to the tether unit (12) and an independent structure (50) such as a shopping cart (51), etc.

It should also be appreciated at this juncture that the back strap members (16) of the harness unit (11) may be employed to temporarily and releasably restrain a child relative to either an independent structure (50) or to the tether unit (12). As shown in FIG. 5, in one mode of deployment the back strap members (16) are operatively secured to a portion of a shopping cart (51) via the releasable securing means (20); wherein, a child's mobility relative to the shopping cart (51) is severely curtailed for obvious safety reasons.

In another mode of disposition the back strap members (16) are operatively secured to one of the loops (22) on the tether unit (12); wherein, the child although captured by the harness unit (11) is only releasably attached to the tether unit (12) and any independent structure (50) to which the tether unit (12) may be attached.

Having thereby described the subject matter of this invention it should be obvious that many substitutions, modifications, and variations of the invention are possible in light of the above teachings. It is therefore to be understood that the invention as taught and described herein is only to be limited to the extent of the breadth and scope of the appended claims.

We claim:

1. A safety harness apparatus adapted to secure a child to an independent structure such as a shopping cart; wherein, the harness apparatus comprises:

a harness unit comprising a belt member operatively secured to a pair of shoulder strap members wherein the belt member comprises an apertured belt element having a cable member running along the length of the belt member and disposed in a surrounding relationship with respect to a plurality of elongated apertures that are formed on one end of the belt element; wherein, the other end of the belt member has a discrete ring member that is secured to said cable member; and wherein, the discrete ring member is dimensioned to pass through a selected one of said plurality of elongated apertures;

a tether unit comprising an elongated length of flexible cable having closed loops formed on both ends; and, a locking means disposed intermediate the harness unit and the tether unit whereby the harness unit may be operatively connected to an independent structure.

2. The safety harness apparatus as in claim 1; wherein, said harness unit further comprises:

a pair of back strap members secured on one end to said shoulder strap members and provided on their other end with releasable securing means.

3. The safety harness apparatus as in claim 2; wherein, said harness unit also includes:

a pair of chest strap elements secured on one end to said pair of shoulder strap members and provided on their other ends with a releasable closure member whereby said shoulder strap members may be connected to one another.

4. The safety harness apparatus as in claim 3; wherein, said shoulder and said back strap members are provided with adjustment means.

5. The safety harness apparatus as in claim 4; wherein, the locking means comprise:

a padlock member having a locking bail element that is dimensioned to receive both the discrete ring member on said harness unit and at least one of the closed loops on said tether unit.

* * * * *